US009537750B2

(12) United States Patent
Mentze et al.

(10) Patent No.: US 9,537,750 B2
(45) Date of Patent: Jan. 3, 2017

(54) MULTICAST ROUTER TOPOLOGY DISCOVERY

(75) Inventors: Duane E. Mentze, Roseville, CA (US); Richard J. Rollins, Penryn, CA (US); Nam Soo Kim, Rocklin, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 43 days.

(21) Appl. No.: 14/395,618

(22) PCT Filed: Apr. 26, 2012

(86) PCT No.: PCT/US2012/035229
§ 371 (c)(1),
(2), (4) Date: Oct. 20, 2014

(87) PCT Pub. No.: WO2013/162579
PCT Pub. Date: Oct. 31, 2013

(65) Prior Publication Data
US 2015/0063163 A1    Mar. 5, 2015

(51) Int. Cl.
*H04L 12/751* (2013.01)
*H04L 29/06* (2006.01)
*H04L 12/761* (2013.01)
*H04L 12/931* (2013.01)

(52) U.S. Cl.
CPC ............ *H04L 45/02* (2013.01); *H04L 49/201* (2013.01); *H04L 65/4076* (2013.01); *H04L 45/16* (2013.01)

(58) Field of Classification Search
CPC .... H04L 49/201; H04L 12/18; H04L 65/4076; H04L 12/185
See application file for complete search history.

(56) References Cited

U.S. PATENT DOCUMENTS 6,795,403 B1    9/2004  Gundavelli
7,715,329 B1    5/2010  Breslau et al.
(Continued)

FOREIGN PATENT DOCUMENTS

CN    1791052 A      6/2006
CN    101335689 A    12/2008
CN    101945043 A    1/2011

OTHER PUBLICATIONS

D. Waitzman, C. Partridge, S. Deering, Distance Vector Multicast Routing Protocol, Network Working Grout RFC 1075, Nov. 1998, pp. 1-24.*
(Continued)

*Primary Examiner* — Christopher Crutchfield
(74) *Attorney, Agent, or Firm* — Brooks, Cameron & Huebsch, PLLC

(57) ABSTRACT

Network devices, systems, and methods, including executable instructions and/or logic thereon, are provided to discover a multicast router topology. A network device includes a processing resource coupled to a memory. The memory includes program instructions executed by the processing resource to discover a multicast router topology by determining a number of routers are connected to each other via a number of network connections and are running a multicast routing protocol (MRP) on a number of interfaces on the number of routers that are connected.

14 Claims, 6 Drawing Sheets

(56) References Cited

U.S. PATENT DOCUMENTS

| | | | |
|---|---|---|---|
| 2002/0181409 A1* | 12/2002 | Shen | H04L 45/02 370/252 |
| 2003/0076854 A1* | 4/2003 | Mudhar | H04L 12/185 370/432 |
| 2003/0097438 A1 | 5/2003 | Bearden et al. | |
| 2003/0135644 A1 | 7/2003 | Barrett | |
| 2004/0252694 A1 | 12/2004 | Adhikari et al. | |
| 2006/0029001 A1 | 2/2006 | Mensch et al. | |
| 2010/0232317 A1 | 9/2010 | Jing et al. | |
| 2011/0064077 A1 | 3/2011 | Wen | |
| 2011/0134797 A1 | 6/2011 | Banks et al. | |
| 2013/0091269 A1* | 4/2013 | Zhang | H04L 49/50 709/224 |

OTHER PUBLICATIONS

B. Fenner, M. Handley, H. Holbrook and I. Kouvelas, Protocol Independent Multicast—Sparse Mode (PIM-SM): Protocol Specification (Revised), IETF RFC 4601, Aug. 2006, pp. 1-112.*
N. Bhaskar, A. Gall, J. Lingard, S. Vennas, Bootstrap Router (BSR) Mechanism for Protocol Independent Multicast (PIM), IETF RFC 5059, Jan. 2008, pp. 1-41.*
Author Unknown, How are spoofed packets detected?, Mar. 5, 2013, pp. 1-3.*
Author Unknown, How to block all multicast traffic travelling through a Cisco Catalyst 3750, pp. 1-2.*
B. Cain, S. Deering, I. Kouvelas, B. Fenner and A. Thyagarajan, Internet Group Management Protocol, Version 3, pp. 1-53.*
Shapiro, et al., "Topology Discovery Service for Router-Assisted Multicast Transport," Apr. 25, 2002, 11 pages, Department of Computer Science University of Massachusetts.
Office Action, CN Application No, 201280072732.0, Date: Sep. 5, 2016, pp. 1-8, SIPO.

* cited by examiner

MULTICAST ROUTER TOPOLOGY DISCOVERY

BACKGROUND

Computing networks can include multiple devices including network devices such as routers, switches, and hubs, computing devices such as servers, desktop PCs, laptops, workstations, and peripheral devices, e.g., printers, facsimile devices, and scanners, networked together across a local area network (LAN), a wireless local area network (MAN), and/or wide area network (WAN).

Multicasting can be used in a network when the same information is needed by a number of devices. Multicasting can reduce the amount of network resources used when sending the multicasting information to a number of devices by sending the information one time to all of the devices that need the information. Multicasting can include logically rotating the multicast information through a network to avoid redundancy and efficiently route the information through the network. The topology of devices on the network used for multicasting the information routing can be helpful to logically route the multicast information through a network. For large networks, it can be difficult to determine the topology of the devices on the network used for multicasting.

DETAILED DESCRIPTION

Figure 1A:
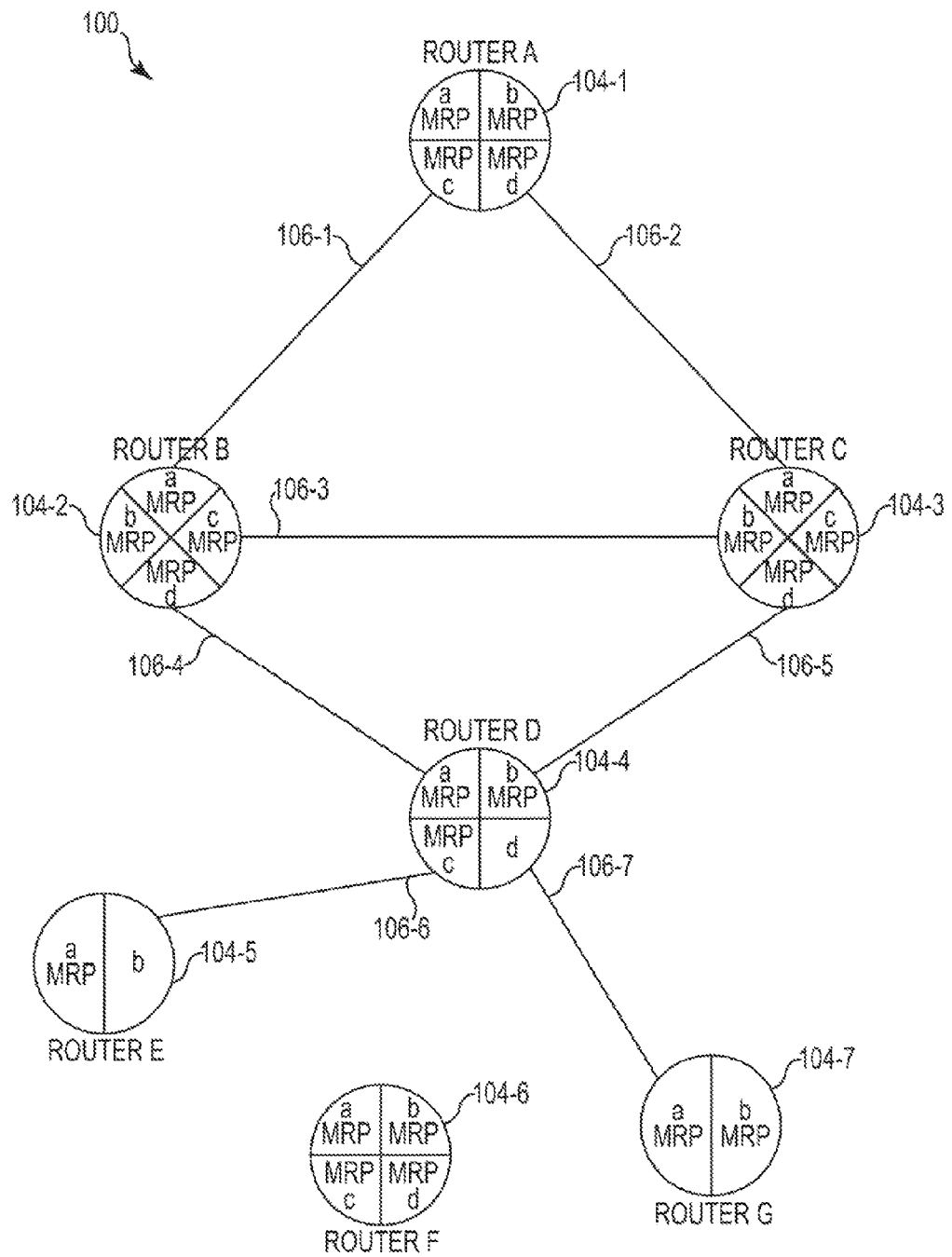
FIGS. 1A-1D illustrate an example of a computing network for discovering a multicast router topology according to the present disclosure.

Embodiments of the present disclosure may include network devices, systems, and methods, including executable instructions and/or logic thereon, to discover a multicast router topology. A network device includes a processing resource coupled to a memory. The memory includes program instructions executed by the processing resource to discover a multicast router topology by determining a number of routers are connected to each other via a number of network connections and are running a multicast routing protocol (MRP) on a number of interfaces on the number of routers that are connected.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 16, and a similar element may be referenced as 208 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIGS. 1A-1D illustrate an example of a computing network 100 for discovering a multicast router topology. The computing network 100 illustrated in FIG. 1A includes a number of routers. In some examples, a computing network can include a number of devices networked together in a local area network (LAN) and/or wide area network (WAN) via routers, hubs, switches, and the like. As used herein a "network device" means a switch, router, hub, bridge, access point, etc., e.g., a router having processor and memory resources and connected to a network 100.

The some examples, devices can be connected to one another and/or to other networks using routers, hubs, and/or switches, among other devices. As noted above, such devices can include a processor in communication with a memory and may include network chips having hardware logic, e.g., in the form of application specific integrated circuits (ASICs), associated with the number of network ports. The term "network" as used herein is not limited to the number, type, and/or configuration of devices illustrated in FIG. 1.

As used herein, a network can provide a communication system that links two or more devices, allows users to access resources on other devices, and exchange messages with other users. A network allows users to share resources on their own systems with other network users and to access information on centrally located systems or systems that are located at remote offices. It may provide connections to the Internet or to the networks of other organizations. Users may interact with network-enabled machine readable instruction, e.g., software and/or firmware, applications to make a network request, such as to get a file. Applications may also communicate with network management machine readable instructions, which can interact with network hardware to transmit information between devices on the network.

The computing network 100 illustrated in FIG. 1A includes router A (104-1), router B (104-2), router C (104-3), router D (104-4), router E (104-5), router F (104-6), and router G (104-7). Each of the routers can include a number of interfaces, where the interfaces are referred to by the router on which they are located and the specific interface on that router. For example interface b on router C is referred to as interface C.b. The number of interfaces can have a multicast routing protocol (MRP) running, as indicated by the MRP designation on the routers illustrated in FIG. 1. In FIG. 1, router 104-1 includes four interfaces, designated as interfaces A.a, A.b, A.c, and A.d. Router 104-2 includes four interfaces, designated as interfaces B.a, B.b, B.c, and B.d. Router 104-3 includes four interfaces, designated as interfaces C.a, C.b, C.c, and C.d. Router 104-4 includes four interfaces, designated as interfaces D.a, D.b, D.c, and D.d. Router 104-5 includes two interfaces, designated as interfaces E.a and E.b. Router 104-6 includes four interfaces, designated as interfaces F.a, F.b, F.c, and F.d. Router 104-7 includes two interfaces, designated as interfaces G.a and G.b.

The routers illustrated in FIG. 1A can include a number of network connections. A number of network connections and routers can be used to connect a router to another router. In FIG. 1A, network connection 106-1 connects interface A.c of router 104-1 to interface B.a of router 104-2. Network connection 106-2 connects interface A.d of router 104-1 to interface C.a of router 104-3. Network connection 106-3 connects interface B.c of router 104-2 to interface C.b of router 104-3. Network connection 106-4 connects interface C.d of router 104-2 to interface D.a of router 104-4. Network connection 106-5 connects interface B.d of router 104-3 to interface D.b of router 104-4. Network connection 106-6 connects interface D.c of router 104-4 to interface E.b of router 104-5. Network connection 106-7 connects interface D.d of router 104-4 to interface G.a of router 104-7. The network connections 106-1, 106-2, 106-3, 106-4, 106-5, 106-6, and 106-7 can be used to transfer data between the number of routers. The network connections can be used to transfer data from any of the interfaces of a router to another interface of another router if there is a network connection connecting the two routers. For example, router 104-1 can have a network connection with router 104-4 via network connection 106-1, router 104-2, and network connection 106-4.

Figure 1B:
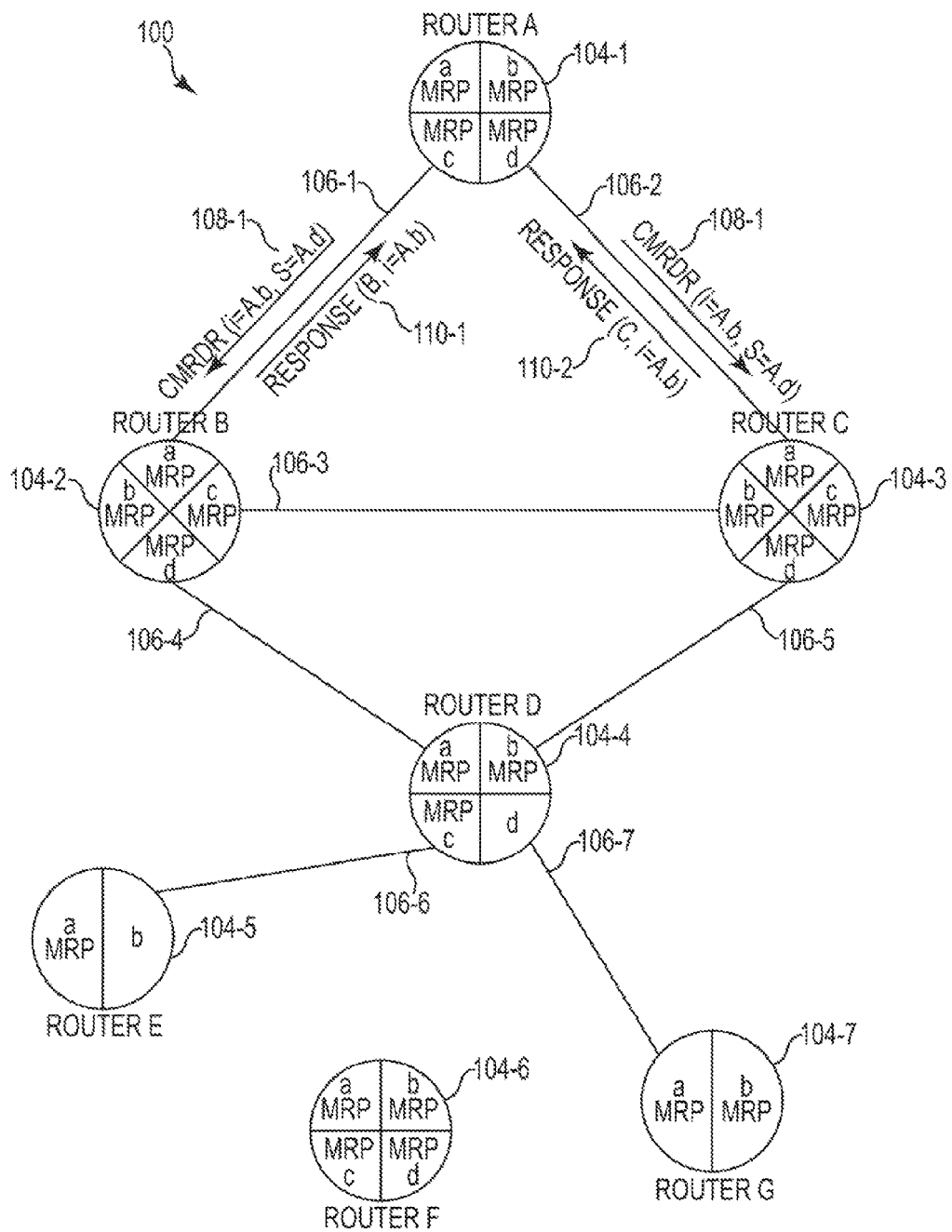

FIG. 1B illustrates an example of a computing network 100 for discovering a multicast router topology. In FIG. 1B, router 104-1 is selected as the initial router. Once router 104-1 is selected as the initial router, router 104-1 is examined to determine if there are interfaces running a multicast routing protocol (MRP). Router 104-1 has four interfaces (A.a, kb, A.c, and A.d) running an MRP. Router 104-1 can send a Connected Multicast Router Discovery Request (CMRDR) associated with each interface that is running an MRP on the router. For example, router 104-1 can send a CMRDR for interface A.a, a CMRDR for A.b, a CMRDR for A.c, and a CMRDR for A.d. The CMRDR's can be sent as single multicast packets on the network connections coupling router 104-1 to other routers in the network. A CMRDR can indicate the interface where the CMRDR was initiated and the interface from which the CMRDR was sent. For example, CMRDR 108-1 can indicate that it was initiated by interface A.b (illustrated by i=A.b in FIG. 16) and was sent from interface A.d (illustrated by S=A.d in FIG. 16). A CMRDR can also include a hop count and a wait time. A hop count can indicates the number of times that the CMRDR can be forwarded throughout the computing network. The wait time indicates the time that the initial router will wait for responses from routers in the computing network.

Router 104-1 can send CMRDR 108-1, via a single multicast packet, to router 104-2 on network connection 106-1 and to router 104-3 on network connection 106-2. CMRDR 108-1 indicates that the CMRDR was initiated by interface A.b and was sent from interface A.d. CMRDR 108-1 can be received by router 104-2 at interface B.a and by router 104-3 at interface C.a. A determination can be made by routers 104-2 and 104-3 to send a response to the initial router 104-1 or to discard CMRDR 108-1. A response can be sent to the initial router 104-1 if the receiving router has a direct network connection to the initial router and/or if the router received the CMRDR on the interface that corresponds to the interface that initiated the CMRDR.

In FIG. 1B, responses 110-1 and 110-2 are sent to router 104-1 because routers 104-2 and 104-3 each have a direct network connection to router 104-1. In the example illustrated in FIG. 1B, response 110-1 can be sent from router 104-2 to router 104-1 on network connection 106-1 and response 110-1 can be sent in response to receiving CMRDR 108-1 from router 104-1 on network connection 106-1. Response 110-1 can indicate that router 104-2 is sending the response (illustrated by B in response 110-1 of FIG. 1B) and that response 110-1 is associated with the request from interface A.b of router 104-1 (illustrated by i=A.b in response 110-1 of FIG. 1B). Response 110-2 can indicate that router 104-3 is sending the response (illustrated by C in response 110-2 of FIG. 1B) and that response 110-1 is associated with the request from interface A.b of router 104-1 (illustrated by i=A.b in response 110-2 of FIG. 1B). Response 110-1 and response 110-2 can be sent as a unicast packet to router 104-1. A response to a CMRDR can include the addresses of the interfaces of the router sending the response that are running an MRP and the subnet information for each of the interfaces, along with other information. For example, response 110-1 can include the addresses of the interfaces of router 104-2 that are running an MRP and the subnet information for each of the interfaces. Response 110-2 can include the addresses of the interfaces of router 104-3 that are running an MRP and the subnet information for each of the interfaces.

Figure 1C:
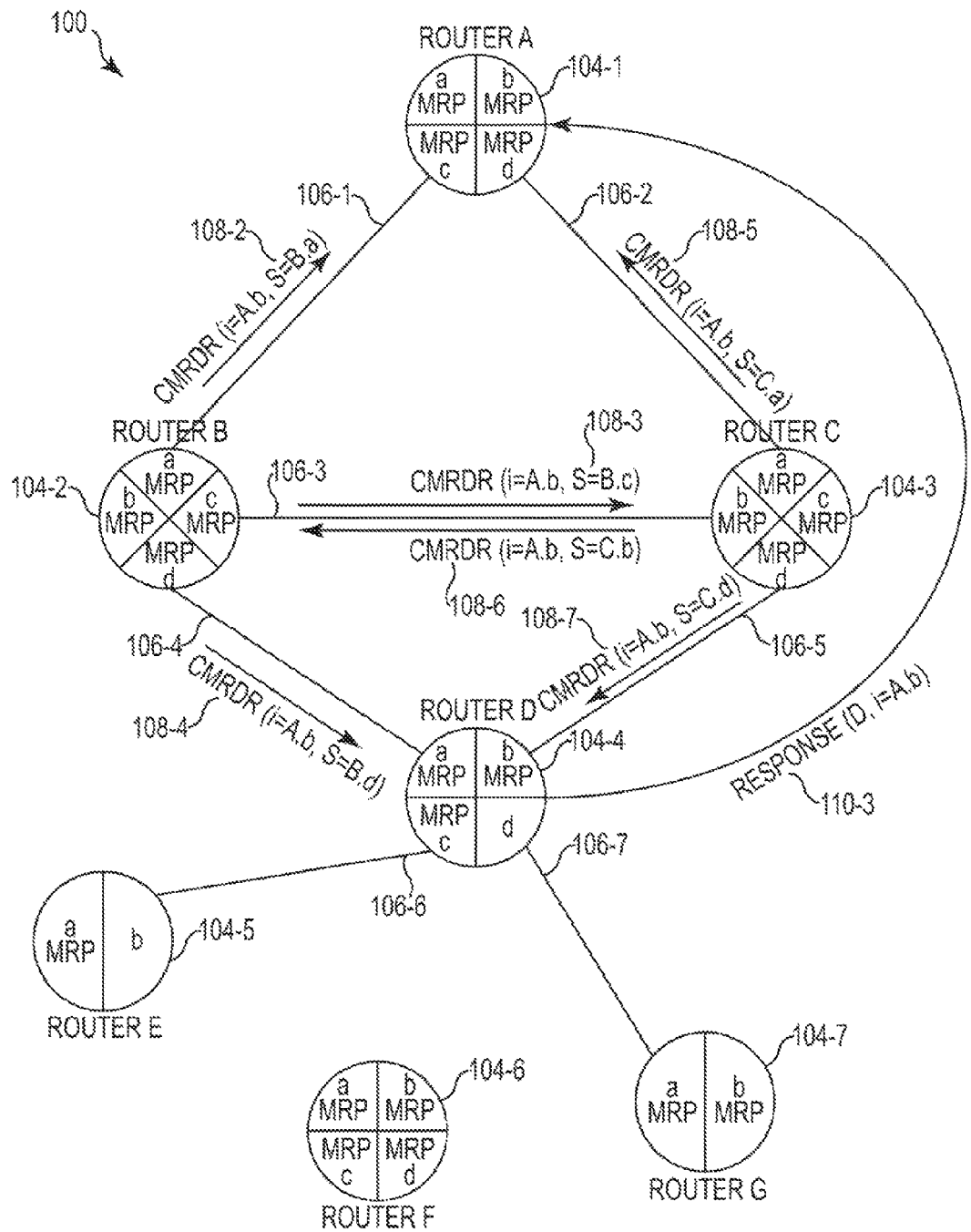

FIG. 1C illustrates an example of a computing network 100 for discovering a multicast router topology. In FIG. 1C, routers 104-2 and 104-3 forward the CMRDR from router 104-1 to other routers in the computing network 100. In some examples, routers that receive a CMRDR and respond to the initial router that sent the CMRDR can forward the CMRDR on their interfaces that are running an MRP and have a network connection with another router. In FIG. 1C, router 104-2 can forward the CMRDR 108-1 received from router 104-1 because router 104-2 sent response 110-1 to router 104-1. Router 104-3 can forward the CMRDR 108-1 received from router 104-1 because router 104-3 sent response 110-2 to router 104-1.

Router 104-2 has three interfaces that are running an MRP and have network connections with another router; therefore router 104-2 can forward the CMRDR from those three interfaces. When forwarding a CMRDR, the router that forwards the CMRDR can update the CMRDR to indicate the router and interface that is forwarding the CMRDR. For example, router 104-2 can forward updated CMRDR 108-2 from interface B.a to interface A.c of router 104-1. CMRDR 108-2 can indicate that it was initiated by interface A.b (illustrated by i=A.b in FIG. 1C) and was sent from interface B.a (illustrated by S=B.a in FIG. 1C). Router 104-2 can forward updated CMRDR 108-3 from interface B.c to interface C.b of router 104-2. CMRDR 108-3 can indicate that it was initiated by interface A.b (illustrated by i=A.b in FIG. 1C) and was sent from interface B.c (illustrated by S=B.c in FIG. 1C). Router 104-2 can forward updated CMRDR 108-4 from interface B.d to interface D.a of router 104-4. CMRDR 108-4 can indicate that it was initiated by interface A.b (illustrated by i=A.b in FIG. 1C) and was sent from interface B.d (illustrated by S=B.d in FIG. 1C).

Once CMRDR 108-2, 108-3, and 108-4 are received by routers 104-1, 104-3, and 104-4, respectively, a determination can be made by the routers to send a response to the initial router 104-1 or to discard the CMRDR. Router 104-1 can discard CMRDR 108-2 because a reverse path forwarding (RPF) check failed, as interface C.b is not the correct path to reach out for interface A.b in router 104-1. A RPF check is a test to determine if the interface that received a CMRDR is the interface that would be used to reach out to the source of the CMRDR. Router 104-4 can discard CMRDR 108-4 because a RPF check failed, as interface D.a is not the correct path to reach out for interface A.b in router 104-1.

Router 104-3 has three interfaces that are running an MRP and have network connections with another router, therefore router 104-3 can forward the CMRDR from those three interfaces. For example, router 104-3 can forward updated CMRDR 108-5 from interface C.a to interface A.d of router 104-1, CMRDR 108-5 can indicate that it was initiated by interface A.b (illustrated by i=A.b in FIG. 1C) and was sent from interface C.a (illustrated by S=C.a in FIG. 1C). Router 104-3 can forward updated CMRDR 108-6 from interface C.b to interface B.c of router 104-2. CMRDR 108-6 can indicate that it was initiated by interface kb (illustrated by i=A.b in FIG. 1C) and was sent from interface C.b (illustrated by S=C.b in FIG. 1C). Router 104-3 can forward updated CMRDR 108-7 from interface C.d to interface D.b of router 104-4. CMRDR 108-7 can indicate that it was initiated by interface A.b (illustrated by i=A.b in FIG. 1C) and was sent from interface C.d (illustrated by S=C.d in FIG. 1C).

Once CMRDR 108-5, 108-6, and 108-7 are received by routers 104-1, 104-2, and 104-4, respectively, a determination can be made by the routers to send a response to the initial router 104-1 or to discard the CMRDR. Router 104-1 can discard CMRDR 108-5 because router 104-1 is the initial router. Router 104-3 can discard CMRDR 108-3 because a RPF check failed, as interface C.b is not the correct path to reach out for interface kb in router 104-1. Router 104-4 can send a response because CMRDR 108-4 is received by interface D.b of router 104-4 a RPF check passes, as interface D.b is the correct path to reach out for interface A.b in router 104-1. In the example illustrated in FIG. 1C, response 110-3 can be sent from router 104-4 to router 104-1 as a unicast packet. Response 110-3 can indicate that router 104-4 is sending the response and that response 110-3 is associated with the request from interface A.b of router 104-1. Response 110-3 can include the addresses of the interfaces of router 104-4 that are running an MRP, along with the subnet information for each of the interfaces.

Figure 1D:
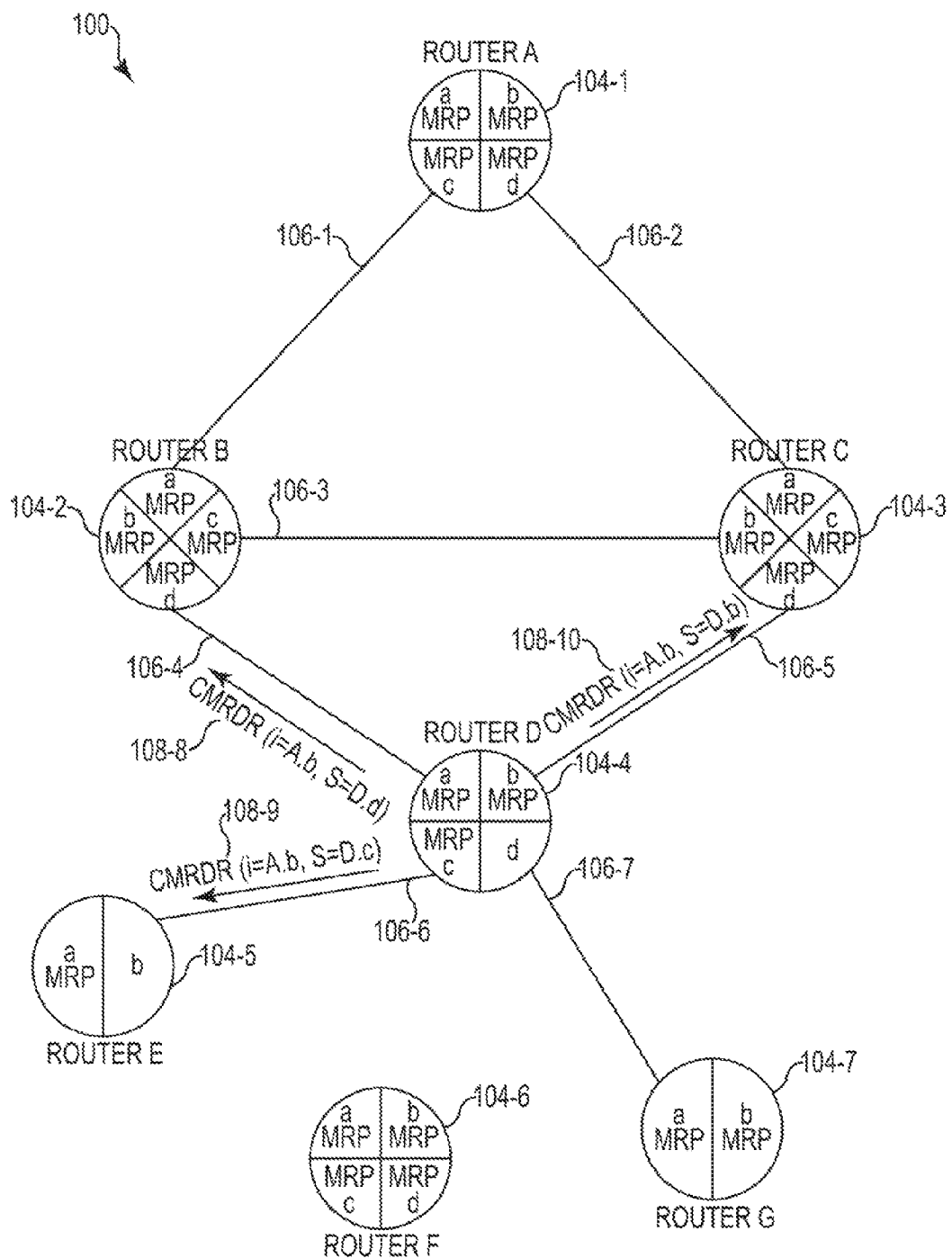

FIG. 1D illustrates an example of a computing network 100 for discovering a multicast router topology. In FIG. 1D, router 104-4 forwards the CMRDR from router 104-1 to other routers in the computing network 100. In some examples, routers that receive a CMRDR and respond to the initial router that sent the CMRDR can forward the CMRDR on their interfaces that are running an MRP and have a network connection with another router. In FIG. 1D, router 104-4 can forward the CMRDR 108-7 received from router 104-3 because CMRDR 108-7 was accepted and processed by router 1044.

Router 104-4 has three interfaces that are running an MRP and have network connections with another router, therefore router 104-4 can forward the CMRDR from those three interfaces. When forwarding a CMRDR, the router that forwards the CMRDR can update the CMRDR to indicate the router and interface that is forwarding the CMRDR. For example, router 104-4 can forward updated CMRDR 108-8 from interface D.a to interface B.d of router 104-2. CMRDR 108-8 can indicate that it was initiated by interface A.b (illustrated by i=A.b in FIG. 10) and was sent from interface D.a (illustrated by S=D.a in FIG. 1D). Router 104-4 can forward updated CMRDR 108-9 from interface ac to interface E.b of router 104-5. CMRDR 108-9 can indicate that it was initiated by interface A.b (illustrated by i=A.b in FIG. 10) and was sent from interface D.c (illustrated by S=D.c in FIG. 1C). Router 104-4 can forward updated CMRDR 108-10 from interface D.b to interface C.d of router 104-3. CMRDR 108-10 can indicate that it was initiated by interface A.b (illustrated by i=A.b in FIG. 1D) and was sent from interface D.b (illustrated by S=D.b in FIG. 1D).

Once CMRDR 108-8, 108-9, and 108-10 are received by routers 104-2, 104-5, and 104-3, respectively, a determination can be made by the routers to send a response to the initial router 104-1 or to discard the CMRDR. Router 104-2 can discard CMRDR 108-8 because a RPF check failed, as interface B.d is not the correct path to reach out for interface A.b in router 104-1. Router 104-5 can drop CMRDR 108-9 because interface E.b of router 104-5 that received CMRDR 108-9 is not running an MRP. Router 104-3 can discard CMRDR 108-10 because a RPF check failed, as interface C.d is not the correct path to reach out for interface A.b in router 104-1.

In the example illustrated in FIG. 10, once the router 104-4 has forwarded the CMRDR, the CMRDR is not forwarded to or from any other routers because the CMRDR was forwarded to interfaces on routers that failed a RPF check or the CMRDR was forwarded to interfaces on routers that are not running an MRP, such as interface E.b on router 104-5. In FIG. 1D, the CMRDR is not forwarded to router 104-6 because there is not a network connection between router 104-6 and another router in the network illustrated in FIG. 1D. The CMRDR is not forwarded to router 104-7 because interface D.d on router 104-4 is not running an MRP, therefore CMRDR cannot be forwarded on network connection 106-7 to interface G.a on router 104-7. Therefore, the CMRDR from initial router 104-1 will not be forwarded to other routers in the computing network 100 and initial router 104-1 will not receive any more responses from routers in the computing network 100. The initial router 104-1 can use the information received in responses 110-1, 110-2, and 110-3 to determine a multicast router topology. The information in responses 110-1, 110-2, and 110-3 can be saved as set in the router 104-1. Once the router has received all of the responses from routers in the computing network and/or the wait time has been exceeded, the information from the responses 110-1, 110-2, and 110-3 can be compiled to determine the multicast router topology for computing network 100.

Figure 2:
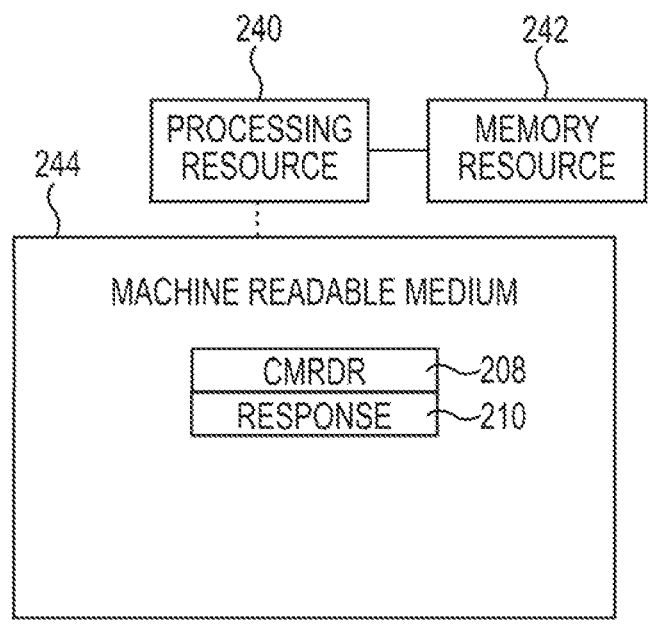
FIG. 2 is a block diagram illustrating a processing resource, a memory resource, and a machine readable medium according to the present disclosure.

FIG. 2 is a block diagram illustrating a processing resource 240, a memory resource 242, and a machine readable medium 244 according to the present disclosure. The processing resource 240 and the memory resource 242 can be local to a computing network, such as on a router. The machine readable medium 244 (e.g., a tangible, non-transitory medium) and/or the memory resource 242 can store a set of instructions (e.g., software, firmware, etc.) executable by the processing resource 240. The machine readable medium can be local to a router or remote therefrom. For those examples in which the machine readable medium is remote from the router, the instructions can be loaded into the memory resource 242 of the router The instructions stored in the machine readable medium 244 can be executed as a programmable option of the router. For example, a network administrator can enable the functionality provided by portions, or all, of the instructions according to the programmable option. Providing the same as a programmable option can be beneficial because various examples of the present disclosure may not be compliant with a number of standards for wireless transmission (e.g., IEEE 802.11). In some examples, the functionality provided by the instructions can, by default, be disabled, and only enabled according to the programmable option, however examples are not so limited.

The instructions can be executed to transmit a CMRDR 208 as a multicast packet from an initial router. The CMRDR 208 can be received by a number of routers on a computing network. Upon receiving the CMRDR, the instruction can be executed by each of the number of routers on the computing network receiving the CMRDR 208 to send a response 210 to the initial router or to discard the CMRDR 208. The instructions can be executed to send a response 210 to the initial router when the router that receives the CMRDR 208 has a network connection to the initial router or when the CMRDR 208 is received by an interface that corresponds to the interface that initiated the CMRDR 208. The instructions can be executed to discard the CMRDR 208 when the CMRDR is received by an interface on a router that fails an RPF check, when the CMRDR is received by an interface that does not correspond to the interface that initiated the CMRDR 208, or when the CMRDR is received by an interface that is not running an MRP. The instructions can be executed to forward the CMRDR 208 by a router that has received the CMRDR 208 and has sent a response 210. The CMRDR can be forward to routers on the computing network that have a network connection with an interface running an MRP.

The instructions can be executed to compile the information from the responses 210 to determine a multicast router topology. The multicast router topology can include information regarding the routers in a computing network running an MRP that have network connections between each other. The multicast router can include the addresses and the subnets for each interface running an MRP that have network connection between each other, among other information. The multicast router topology can be transferred to other computing device on the computing network and can be used to determine how to transmit multicast packets on the computing network.

Figure 3:
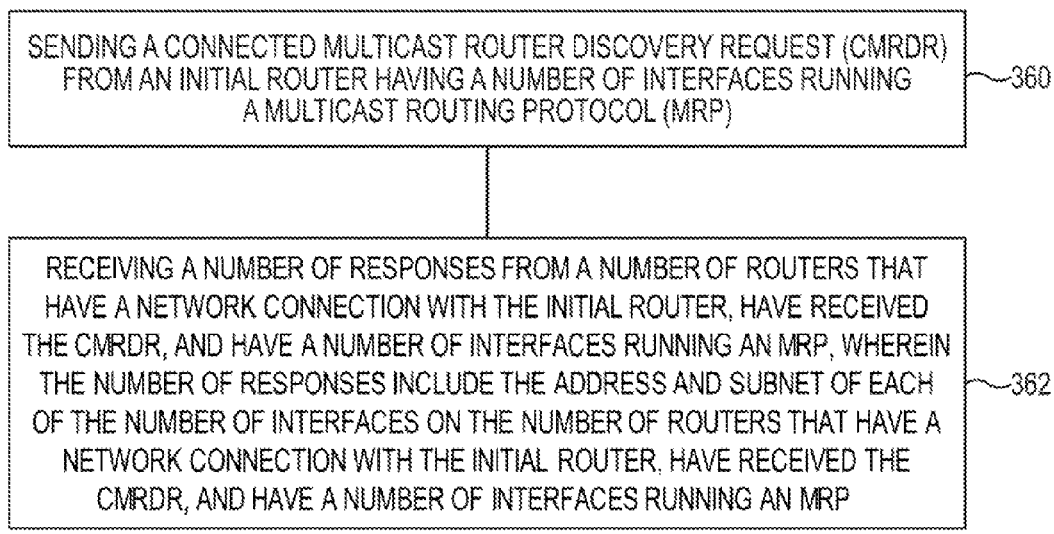
FIG. 3 provides a flow chart illustrating an example of a method for discovering a multicast router topology according to the present disclosure.

FIG. 3 provides a flow chart illustrating an example of a method for discovering a multicast router topology. At step 360, a connected multicast router discovery request (CMRDR) can be sent from an initial router having a number of interfaces running a multicast routing protocol (MRP). A CMRDR can be sent as a single multicast packet from the interfaces on the initial router running an MRP. A CMRDR can include information indicating the router and interface that initiated the CMRDR, the router and interface that is sending the CMRDR, a hop count associated with the CMRDR, and a time limit associated with the CMRDR. The hop count associated with the CMRDR can indicate how many times the CMRDR can be forwarded to routers in a computing network. For example, a CMRDR can be forwarded by a router that has sent a response to the initial router. Each by the CMRDR is forwarded the hop count can be decremented and the CMRDR can be forwarded by routers that have sent a response to the initial router until the hop count is decremented to zero. The time limit associated with the CMRDR can limit the amount of time that the initial router will wait for responses from routers in a computing network before compiling the multicast router topology. For example, CMRDRs with increasing hop counts and/or time limits can be sent until the same multicast router topology is created repeatedly, thus indicating that multicast router topology created is complete.

At step 362, a number of responses can be received from a number of routers that have a network connection with the initial router, that received the CMRDR, and that have a number of interfaces running an MRP, wherein the number of responses include the address and subnet of each of the number of interfaces on the number of routers that have a network connection with the initial router, received the CMRDR, and have a number of interfaces running an MRP. Responses can be sent to the initial router as a unicast packet. A response can be sent from a router that receives a CMRDR if the router has a direct network connection with the initial router and has not already sent a response to the initial router or if the CMRDR is received on an interface that corresponds to the interface that initiated the CMRDR on the initial router.

It is to be understood that the above description has been made in an illustrative fashion, and not a restrictive one. Although specific examples have been illustrated and described herein, other component arrangements and device logic can be substituted for the specific examples shown. Accordingly, the present disclosure is not limited to the use of more than one spatial stream. The present disclosure not limited to the use of more than one antenna for a particular device.

What is claimed is:

1. A network device to discover a multicast router topology, comprising:
    a processing resource; and
    a memory resource coupled to the processing resource, wherein the memory resource stores instructions executable by the processing resource to:
        send a connected multicast router discovery request (CMRDR) from an initial router having a number of interfaces running a multicast routing protocol (MRP);
        receive a first number of responses from a first number of routers that have a network connection with the initial router, have received the CMRDR, and have a number of interfaces running an MRP, wherein the first number of responses include the address and subnet of each of the number of interfaces on the first number of routers that have a network connection with the initial router, have received the CMRDR, and have a number of interfaces running an MRP;
        receive a second number of responses from a second number of routers that have a network connection with the first number of routers, have received the CMRDR forwarded from the first number of routers, and have a number of interfaces running an MRP;
        create a multicast router topology of the initial router, the first number of routers, and the second number of routers by determining the initial router, the first number of routers, and the second number of routers are connected to each other via a number of network connections and are running the multicast routing protocol (MRP) on the number of interfaces on the initial router, the first number of routers, and the second number of routers that are connected.

2. The device of claim 1, wherein the multicast router topology includes an address and a subnet of each interface of the number of interfaces on the initial router, the first number of routers, and the second number of routers that are connected and are running an MRP.

3. The device of claim 1, wherein the multicast router topology is discovered by initiating the CMRDR from an interface on the initial router.

4. The device of claim 3, wherein a first response of the number of first responses is sent to the initial router from a router of the first number of routers that receives the CMRDR on an interface that corresponds to the interface on the initial router that initiated the CMRDR.

5. The device of claim 4, wherein the response is a unicast packet indicating the address and subnet of the router that received the CMRDR on the interface that corresponds to the interface on the initial router that initiated the CMRDR.

6. The device of claim 3, wherein the CMRDR is a single multicast packet.

7. A method for discovering a multicast router topology, comprising:
- sending a connected multicast router discovery request (CMRDR) from an initial router having a number of interfaces running a multicast routing protocol (MRP);
- receiving a first number of responses from a first number of routers that have a network connection with the initial router, have received the CMRDR, and have a number of interfaces running an MRP, wherein the first number of responses include the address and subnet of each of the number of interfaces on the first number of routers that have a network connection with the initial router, have received the CMRDR, and have a number of interfaces running an MRP;
- forwarding the CMRDR from the first number of routers to a second number of routers; and
- receiving a second number of responses from the second number of routers that have a network connection with the first number of routers, have received the CMRDR forwarded from the first number of routers, and have a number of interfaces running an MRP.

8. The method of claim 7, wherein receiving the first number of responses includes receiving unicast responses from the first number of routers that receive the CMRDR on an interface that corresponds to an interface on the initial router that initiated the CMRDR.

9. The method of claim 7, wherein the method includes including a hop count and a time limit in the CMRDR, wherein the time limit includes an amount of time that the initial router will wait to receive the first number of responses and the second number of responses before compiling the multicast router topology.

10. The method of claim 7, wherein the method includes discarding the CMRDR if the CMRDR is received by an interface without multicast routing enabled.

11. The method of claim 7, wherein the method includes discarding the CMRDR if the CMRDR is received by an interface of a router of the first number of routers that does not correspond to an interface on the initial router that initiated the CMRDR.

12. A non-transitory computer-readable medium storing a set of instructions executable by a processor, wherein the set of instructions are executed by the processor to:
- send a connected multicast router discovery request (CMRDR) from an initial router having a number of interfaces running a multicast routing protocol (MRP);
- receive a first number of responses from a first number of routers that have a network connection with the initial router, have received the CMRDR, and have a number of interfaces running an MRP, wherein the first number of responses include the address and subnet of each of the number of interfaces on the first number of routers that have a network connection with the initial router, have received the CMRDR, and have a number of interfaces running an MRP;
- receive a second number of responses from a second number of routers that have a network connection with the first number of routers, have received the CMRDR forwarded from the first number of routers, and have a number of interfaces running an MRP; and
- create a multicast routing topology of the initial router, the first number of routers, and the second number of routers, wherein the multicast routing topology indicates the initial router, the first number of routers, and the second number of routers that are connected together via a number of network connections and a number of interfaces on the initial router, the first number of routers, and the second number of routers connected together that are running a multicast routing protocol (MRP).

13. The medium of claim 12, wherein the multicast routing topology is created based on information in the first number of responses and the second number of responses.

14. The medium of claim 13, wherein the multicast topology is created by compiling the information in the first number of responses and the second number of responses after a wait time has expired.

* * * * *